United States Patent [19]

Cordes

[11] Patent Number: 4,941,900

[45] Date of Patent: Jul. 17, 1990

[54] APPARATUS AND METHOD FOR GAS-LIQUID SEPARATION AND FILTRATION

[75] Inventor: Harry Cordes, Largo, Fla.

[73] Assignee: Pall Corporation, East Hills, N.Y.

[21] Appl. No.: 221,282

[22] Filed: Jul. 19, 1988

[51] Int. Cl.⁵ .............................................. B01D 29/06
[52] U.S. Cl. .................................. 55/319; 55/333; 55/337; 55/459.1; 55/487; 55/498; 55/521; 55/DIG. 25
[58] Field of Search ................. 55/97, 307, 333, 337, 55/459.1, 486–488, 498, 521, DIG. 25, 319

[56] References Cited

U.S. PATENT DOCUMENTS

| | | | |
|---|---|---|---|
| 2,514,623 | 7/1950 | Brown | 55/333 |
| 3,078,650 | 2/1963 | Anderson et al. | 55/337 |
| 3,115,459 | 12/1963 | Glesse | 55/DIG. 25 |
| 3,384,241 | 5/1968 | Nostrand | 55/487 X |
| 3,386,230 | 6/1968 | Riesberg et al. | 55/498 X |
| 3,527,027 | 9/1970 | Knight et al. | 55/487 X |
| 3,672,130 | 6/1972 | Sullivan et al. | 55/333 X |
| 3,680,659 | 8/1972 | Kasten | 55/486 X |
| 3,708,965 | 1/1973 | Domnick | 55/488 |
| 3,802,160 | 4/1974 | Foltz | 55/498 X |
| 3,807,150 | 4/1974 | Maracle | 55/498 |
| 3,876,400 | 4/1975 | Frantz | 55/337 X |
| 3,890,123 | 6/1975 | Kuga | 55/486 X |
| 3,936,284 | 2/1976 | Mason | 55/485 |
| 4,053,290 | 10/1977 | Chen et al. | 55/488 X |
| 4,086,070 | 4/1978 | Argo et al. | 55/486 X |
| 4,111,815 | 9/1978 | Walker et al. | 55/498 X |
| 4,203,739 | 5/1980 | Erdmannsdörfer | 55/487 X |
| 4,231,768 | 11/1980 | Seibert et al. | 55/487 X |
| 4,233,042 | 11/1980 | Tao | 55/488 X |
| 4,249,918 | 2/1981 | Argo et al. | 55/488 X |
| 4,251,375 | 2/1981 | Pakki et al. | |
| 4,253,954 | 3/1981 | Midkiff et al. | 210/168 |
| 4,297,116 | 10/1981 | Cusick et al. | |
| 4,487,618 | 12/1984 | Mann | 55/498 X |
| 4,516,994 | 5/1985 | Kocher | 55/337 |
| 4,632,682 | 12/1986 | Erdmannsdörfer | 55/486 X |
| 4,676,807 | 6/1987 | Miller et al. | 55/DIG. 25 |
| 4,692,175 | 9/1987 | Frantz | 55/333 X |
| 4,759,782 | 7/1988 | Miller et al. | 55/487 |

FOREIGN PATENT DOCUMENTS

| | | |
|---|---|---|
| 3440506 | 5/1986 | Fed. Rep. of Germany . |
| WO88/06058 | 8/1988 | PCT Int'l Appl. . |
| 961125 | 6/1964 | United Kingdom . |
| 1208789 | 10/1970 | United Kingdom . |
| 1433037 | 4/1976 | United Kingdom . |
| 1544822 | 4/1979 | United Kingdom . |
| 2194180A | 3/1988 | United Kingdom . |

*Primary Examiner*—Robert Spitzer
*Attorney, Agent, or Firm*—Leydig, Voit & Mayer

[57] ABSTRACT

An air filtering device and related method for the removal of liquids and particulate matter from an air stream such as may be used in an aircraft environmental control system. The invention is comprised of an inertial separator and a combination coalescer and HEPA-rated filter preferably all located in the same housing. Air entering the housing flows into an inertial separator which removes most of the entrained liquid from the air. Substantially all of the remaining liquid is eliminated by the coalescing element with the coalescer functioning at least in part as an evaporator due to the low saturation level of the air flowing from the inertial separator. Biological and other particulate removal is accomplished by the subsequent passing of the air through the HEPA-rated filter medium.

7 Claims, 1 Drawing Sheet

APPARATUS AND METHOD FOR GAS-LIQUID SEPARATION AND FILTRATION

FIELD OF THE INVENTION

The present invention relates generally to devices and methods for the filtration of air or other gaseous streams, this device and method being particularly directed toward the removal of liquids and particulate matter from the aforementioned streams.

BACKGROUND OF THE INVENTION

In many applications, it is desirable to use as a feed stream air or other gaseous mixture that is substantially free of any entrained liquids as aerosols and particulate matter, the presence of these impurities often substantially affecting the efficiency of a device using this feed stream. By way of example, consider an oxygen concentrator, one of the principle elements in an oxygen generation system used aboard some aircraft. If the air entering this concentrator is contaminated by liquid aerosols, concentrator efficiency may be lowered by as much as thirty percent. Liquid aerosols are also suspected of causing the molecular sieve used in oxygen generation beds to disintegrate, resulting in early system failure.

In view of the problems which may be encountered when liquid aerosols are present, it has become common practice to attempt to remove liquid aerosols by first employing the use of a separator, this device having the ability to remove the bulk of liquid aerosols entrained in the entering air or gas stream. The finer aerosols, which follow the streamlines of the gas and are not removed efficiently by this means, are conducted to a coalescing medium. The coalescer is typically located a varying distance downstream from the separator. On contact with the coalescer, the fine aerosols form droplets on the medium. To the extent any of these droplets become large enough to be influenced by gravitational forces, such droplets fall into a sump which may be drained as required.

It is also common in aircraft systems to have an ultrafine filter medium, such as a HEPA-rated filter for particulate removal located downstream from the coalescing medium. These types of filters will also fail or operate at a reduced level of efficiency if contaminated by liquid aerosols. To preclude possible contamination, there is a minimum recommended spacial separation to be used between the coalescer and HEPA-rated filter. Alternatively, others have placed two HEPA-rated filters in series and spaced so as to prevent liquid carry-over by the airstream.

Moreover, the previously described problems associated with the presence of liquid aerosols can become exacerbated if the gas being conducted from the separator to the coalescing medium encounters an environment which cools the gas to its dew point. This cooling can result not only in the formation of additional aerosols, but can also result in liquid aerosols passing through the coalescing medium while still in the liquid phase, an effect which is undesirable in certain applications, such as the aircraft environment described previously.

Compounding the problems evident in the approaches and systems described above, space and weight efficiency are of considerable importance in aircraft applications.

OBJECTS AND SUMMARY OF THE INVENTION

The general object of this invention is to provide a new and improved filtration device and method for the removal of liquid aerosols and particulate matter from gaseous streams, particularly air streams.

A further object is to remove all liquid aerosols contained in the air stream with an extremely high degree of efficiency, while also minimizing not only the space such a device would require upon installation, but also the weight of the device.

A more specific object is to minimize, to the extent possible, the reduction in dry bulb temperature of the gas stream (or increase in relative humidity) that is experienced when effluent gas or air from the separator is conducted to the coalescing medium.

Another object is to remove the liquid aerosols to such a degree so as to permit the location of a coalescing medium in close proximity to the particulate filter medium, this arrangement saving space without sacrificing any liquid removal efficiency.

These and other features and advantages of the invention will be more readily apparent from the following description.

Generally, the invention is embodied in an air-liquid separation and filtration apparatus such as is used in an aircraft environmental control system. The invention is comprised of an inertial separator and a combination coalescer and HEPA-rated filter located in the same housing. Air entering the housing flows into an inertial separator which removes substantially all of the entrained liquid from the air stream. The air then contacts the annular combination coalescer and particulate filter, this filter comprising a coalescing medium, a particulate filter located downstream from and in close proximity to the coalescing element, and a perforated support core adjacent to the particulate medium. Substantially all of the remaining entrained liquid is eliminated by the coalescing element with the coalescer functioning in part as an evaporator due to the low saturation level of the air flowing from the inertial separator. Biological and other particulate removal is accomplished by the subsequent passing of the air through the particulate filter.

DETAILED DESCRIPTION OF THE PREFERRED EMBODIMENTS

Although the structures with which this invention is concerned may be operated in many different spatial orientations, for the sake of convenience and clarity of description reference will be made hereinafter to the top or bottom of the various structural elements, meaning, the top and bottom as they are oriented in FIG. 2. Also, while the apparatus is useful for the separation and filtration of liquids from any gaseous stream, the invention realizes its greatest advantage in the separation and filtration of an air-water stream and therefore the preferred embodiment will be described as such. However, it should be noted that I do not intend to limit the invention to this embodiment. On the contrary, I intend to cover all alternatives, modifications and equivalents as may be included within the spirit and scope of the invention as defined by the appended claims.

Figure 2:
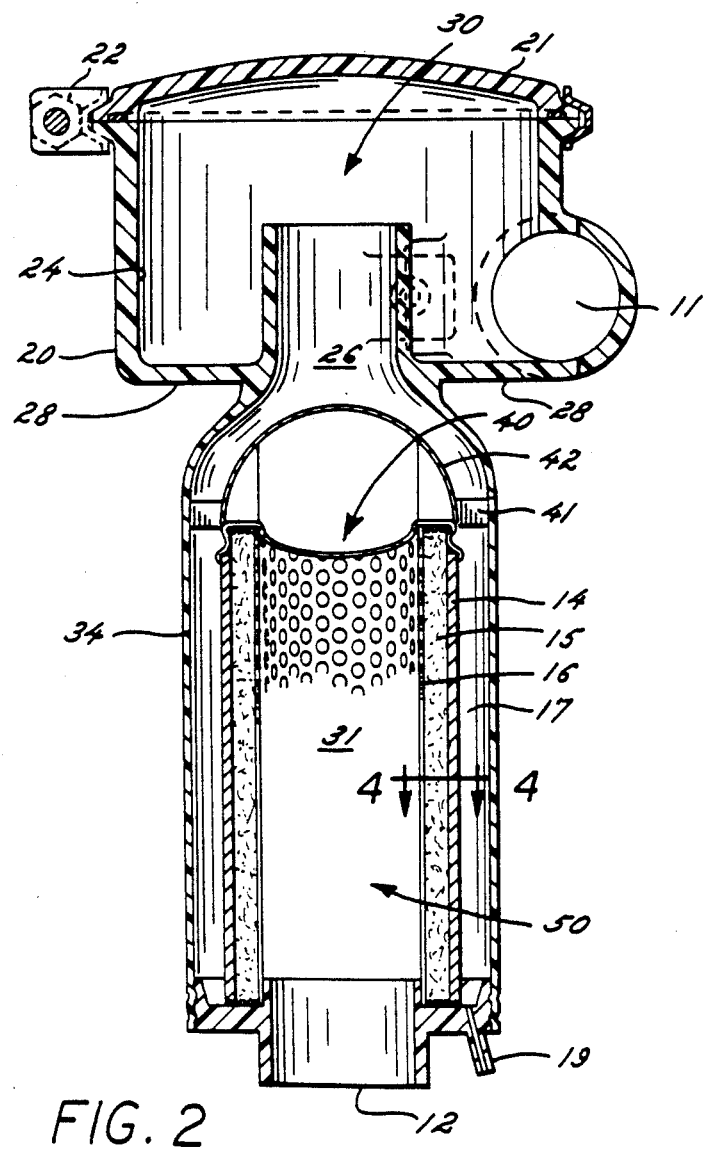
FIG. 2 shows a cross-sectional view of the preferred embodiment taken along line 2—2 of FIG. 1.
Figure 4:
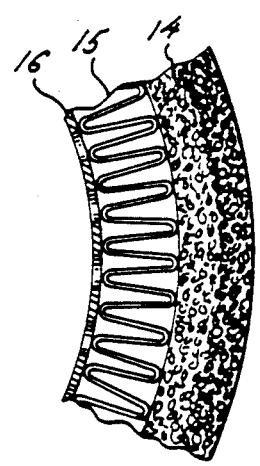
FIG. 4 illustrates a sectional view of the coalescing medium, a conventional particulate filter, and perforated support core assembly, taken along line 4—4 of FIG. 2.

Turning first to FIG. 2, there is shown an air-water separating and filtering device embodying the present invention comprising a housing with a separate air inlet 11 and air outlet 12, within this housing an annular coalescing and filtering device comprising a coalescing medium 14, a particulate filter 15, perforated support core 16 and means for removing the coalesced liquid from the housing 19. The housing is comprised of a body 20 and a base 21. The base 21 is detachably secured to the body by fastening means, for example, a V-band and bolt 22.

The body 20 is divided into two main chambers, an upper 30 and a lower chamber 31. The upper chamber 30 has an air inlet 11 located tangential to the side wall of the chamber 30. The two chambers are connected by a passageway 26 located within the body 20.

Figure 1:
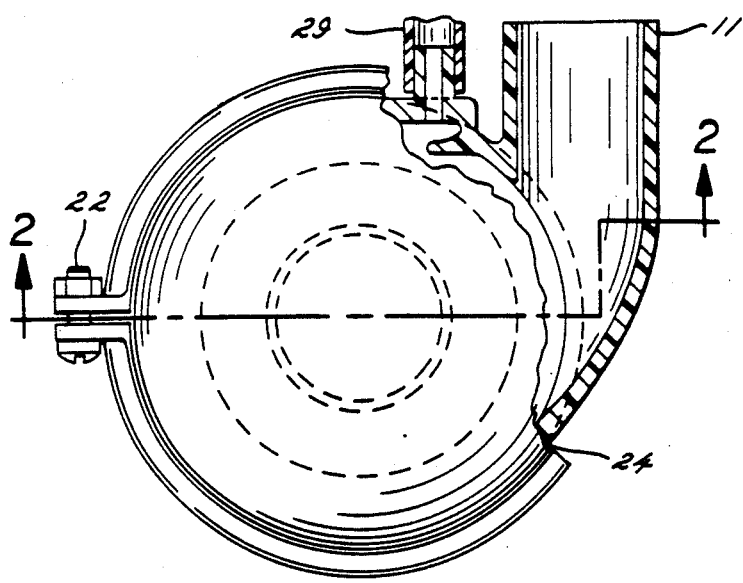
FIG. 1 is a top view of an inertial separator, the separating means used in the preferred embodiment of the invention.
Figure 3:
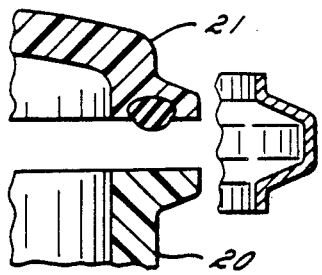
FIG. 3 is an enlarged fragmentary view of the cover fastening means.

The upper chamber 30, shown in FIG. 1, is essentially cylindrical, being defined by the base 21, side wall 24 and chamber partition 28. This partition is comprised of the aforementioned passageway 26, the balance consisting of any material impervious to air and liquids. This chamber 30 defines an inertial separator of known design and construction. The dimensions of the chamber 30 are dependent upon the design parameters of the separator and, more generally, on the design of the environmental control system itself. A preferred design of the separator would allow separation of substantially all liquid aerosols from the air or gas steam above about 25 microns in diameter. A means 29 for draining the separated liquid aerosols from the upper chamber is also provided.

The separated air leaves the upper chamber by way of the passageway 26 and flows into the lower chamber 31. The lower chamber is similarly cylindrical in design. The content of this chamber is comprised of a coalescing medium 14, a particulate filter 15 downstream from and in close proximity to the coalescing medium 14 and a perforated support core 16.

In this embodiment, the coalescing element is cylindrically shaped and located so as to form an annular space 17 between its outer surface and the inner wall 34 of the lower chamber 31. The particular coalescing medium chosen is not essential to the invention, however, it is contemplated that the medium be both hydrophobic and oleo-phobic so that it resists wetting. An example of such a medium would be a graduated pore Profile® medium having the properties described above. The Profile® element contemplated by the present invention is comprised of fibers, the fibers being arranged so as to form pores such that the average pore size varies continuously across at least a portion of the thickness of this element. The fibers are preferably comprised of polypropylene.

The particulate filter 15 is also cylindrically shaped and is located in close proximity to the coalescing medium 14. The term "in close proximity to" is defined, for the purposes of this invention, as placing the filter 15 adjacent to the coalescer 14 or at any distance from the coalescer up to and including the minimum recommended spatial separation for prevention of liquid carryover. Regarding the composition of the filter 15, the preferred embodiment uses a HEPA-rated medium, this being the acronym for High Efficiency Particulate Airfilter. This type of filter may be for example, a glass fiber membrane having intimately distributed pores capable of filtering large volumes of particulate matter from air passing therethrough. It is contemplated that the medium be pleated for high surface area removal and operating efficiency. An alternate type of filter that may be used successfully in this application is a graduated pore Profile® element.

The perforated support core 16 is positioned downstream from the particulate filter 15 and adds structural stability to the filter and coalescer. Although there are no substantial limitations on perforation size, the perforations must be sufficient to allow the flow of air across the coalescing medium filter and without any significant pressure drop while still functioning as a support device. Although the contemplated composition of the core 16 is metal, any type of material with sufficient strength may be substituted.

The upper portion of this coalescer, filter and support core assembly is sealed by an end cap 40. Anti-vibration vanes 41 extending radially from the top of this assembly to the inner wall 34 of the lower chamber 31 help hold the assembly in place.

A flow modifier 42 capable of directing the flow of air entering the lower chamber 31 into the annular space 17 defined by the outer surface of the coalescing medium 14 and the inner wall 34 of the lower chamber 31 is positioned above the assembly. This allows air entering the lower chamber 31 through the passageway 26 to be directed into the annular space 17 to contact with the coalescing medium 14. The air then passes through the particulate filter 15, perforated support core 16 and into a central chamber 50, this chamber being defined by the end cap 40 and inner wall of the perforated support core 16. The fully treated air then exits the chamber 50 and the housing by way of an air outlet 12. A means 19 or draining any coalesced liquid which was not evaporated into the air is located at the bottom of the annular space. To effect high efficiency removal of any remaining liquids, the draining means should be located on the apparatus in a position that will allow it to be at its lowest point when the aircraft or other structure into which the apparatus is installed is normally at rest.

In accordance with an important feature of the invention, the separating means and coalescing medium are located within the same housing, thereby eliminating any temperature variations which might affect the air stream's liquid-to-vapor content as it passes from the separating means to the coalescing medium. Those skilled in the art will appreciate the fact that this, in essence, allows liquid removal to occur only in the upper chamber 30 which defines a separating means or the lower chamber 31 which houses a coalescer thereby eliminating the undesirable result of prior systems which permitted removal of liquid while the air was in transport from separator to coalescer. In other words, the humidity level of the air is now able to be maintained at a constant level as it is conducted from the separator to the coalescing medium.

The operating advantages of the disclosed device at the coalescing medium surface are also significant. The fine liquid aerosols that are not removed from the air stream by the inertial separating means are virtually completely removed by the coalescing medium. It has been found, however, that removal is not accomplished entirely by the known method of coalescing, but in part by evaporating the coalesced liquid from the medium into the air. To facilitate this process, the air entering the lower chamber 31 should be in a supercooled condition before it reaches the coalescing medium. Upon contact with the medium, the liquids will first coalesce, then evaporate into the unsaturated air, thereby increasing the moisture loading or humidity of the effluent air. Although the total moisture content of the air may remain the same, a phase change in the liquid is experienced. This has the effect of assuring virtual complete liquid aerosol removal, rendering unnecessary the redundancy employed by prior systems in the liquid removal area.

Explaining the previously described phenomenon from a rate of flow perspective, in order to ensure that the coalesced liquid passes downstream as a vapor, the rate of liquid aerosols which are deposited on the coalescer should be equal to the rate of water being evaporated by the unsaturated air stream. Recognizing this, the rate of deposit of the liquid aerosols on the coalescing medium can be controlled by providing the medium with sufficient surface area to cause less than a threshold amount of liquid to be collected per unit area per unit time. By designing the coalescer to keep the amount of liquid deposited on it below this threshold level, the particulate filter will not be contaminated by any entrained liquids.

The aforementioned elimination of liquid aerosols by the coalescing medium also allows the locating of the particulate filter 15, such as a HEPA-rated medium, in close proximity to the coalescing medium 14 without the need for redundancy due to liquid carryover. In the preferred embodiment, the HEPA-rated filter 15 is located adjacent to the coalescer 14, a very space efficient configuration. Moreover, the redundancy found in prior systems is reduced by eliminating the need for separate housings for the coalescer and for the HEPA filter, resulting in both weight and space savings.

The outside-in flow configuration of the coalescer/particulate filter/perforated support core assembly as described in the preferred embodiment also saves space over prior systems.

While the preferred embodiment has placed the coalescer/particulate filter/support core assembly within the same housing as the separating means, this is only one embodiment of the invention. The assembly may also be located downstream from the separating means. However, the location of the assembly should be such as to not allow the temperature of the separated air leaving the separator to reach its dew point before the air contacts the coalescing medium, this being an important aspect of the invention. As an example, the aforesaid assembly, after being encased in an appropriate housing, may be mounted directly onto the separating means, with an appropriate connection made between the assembly's air inlet with the air outlet of the separating means.

I claim:

1. A gas-liquid separating and filtering apparatus for treating supercooled gases comprising:
    (a) a housing, said housing having a separate gas inlet and gas outlet;
    (b) means for providing supercooled gas to said gas inlet;
    (c) means within said housing for separating substantially all liquid aerosols above about 25 microns in diameter;
    (d) means for removing the separated liquid from said housing;
    (e) an annular separating and filtering device downstream from said separating means and within said housing comprising:
        (i) a coalescing medium for intercepting any remaining entrained aerosols, the coalescing medium being adapted to effect evaporation of at least a portion of the coalesced liquid into the gas; and
        (ii) a particulate filter located in close proximity to and downstream from said coalescing medium.

2. The apparatus of claim 1 wherein said annular separating and filtering device has said coalescing medium as its outer element and said particulate filter as its inner element.

3. The apparatus of claim 2 wherein said means for air-liquid separation is an inertial separator.

4. The apparatus of claim 3 wherein said particulate filter is a HEPA-rated filter.

5. The apparatus of claim 4 wherein said coalescing element comprises a fibrous element, wherein the average pore size decreases across at least a portion of the thickness of said element.

6. The apparatus of claim 5 wherein said HEPA-rated filter comprises a fibrous element, wherein the average pore size decreases across at least a portion of the thickness of said element.

7. The apparatus of claim 5 further comprising means for removing coalesced liquid located on said apparatus in a position that will allow it to be at its lowest point when the structure onto which the apparatus is installed is normally at rest.

* * * * *

UNITED STATES PATENT AND TRADEMARK OFFICE
CERTIFICATE OF CORRECTION

PATENT NO. : 4,941,900

DATED : July 17, 1990

INVENTOR(S) : Harry Cordes

It is certified that error appears in the above-identified patent and that said Letters Patent is hereby corrected as shown below:

On the title page, item [56], in the References Cited:
U.S. Patent No. 3,115,459, change "Glesse" to -- Giesse --.

Column 4, Line 39, change "19 or" to -- 19 for --.

Signed and Sealed this

Fifth Day of May, 1992

Attest:

DOUGLAS B. COMER

*Attesting Officer*  *Acting Commissioner of Patents and Trademarks*